United States Patent [19]

Kim

[11] Patent Number: 4,533,440
[45] Date of Patent: Aug. 6, 1985

[54] METHOD FOR CONTINUOUS MEASUREMENT OF THE SULFITE/SULFATE RATIO

[75] Inventor: Bang M. Kim, Schenectady, N.Y.

[73] Assignee: General Electric Company, Schenectady, N.Y.

[21] Appl. No.: 520,389

[22] Filed: Aug. 4, 1983

[51] Int. Cl.³ .............................................. G01N 27/52
[52] U.S. Cl. ...................................... 204/1 T; 204/400
[58] Field of Search .............. 204/1 F, 1 T, 400, 435, 204/92

[56] References Cited

U.S. PATENT DOCUMENTS

| | | | |
|---|---|---|---|
| 3,692,624 | 9/1972 | Yrjala | 204/412 |
| 3,826,971 | 7/1974 | Jasinski et al. | 204/1 F |
| 3,959,108 | 5/1976 | Plumpe, Jr. | 204/1 F X |

FOREIGN PATENT DOCUMENTS

| | | | |
|---|---|---|---|
| 0022916 | 8/1975 | Japan | 204/1 F |
| 0154457 | 12/1980 | Japan | 204/1 F |

OTHER PUBLICATIONS

Instrumental Methods of Analysis by H. H. Willard et al., 4th Edition, (Chapter 20) pp. 531–541.

*Primary Examiner*—Andrew H. Metz
*Assistant Examiner*—Nam X. Nguyen
*Attorney, Agent, or Firm*—Lawrence D. Cutter; James C. Davis, Jr.; Marvin Snyder

[57] ABSTRACT

The redox potential is used as a measure of the ratio of sulfite and sulfate ions in a solution containing these ions. In one embodiment of the present invention a slip stream sample of a process solution is divided into two components one of which is oxidized to serve as a reference solution. The ratio of sulfite and sulfate ions or the oxidation state of the solution is indicated by the oxidation potential of a process solution or the potential difference between electrodes disposed within a process solution and a reference solution.

11 Claims, 5 Drawing Figures

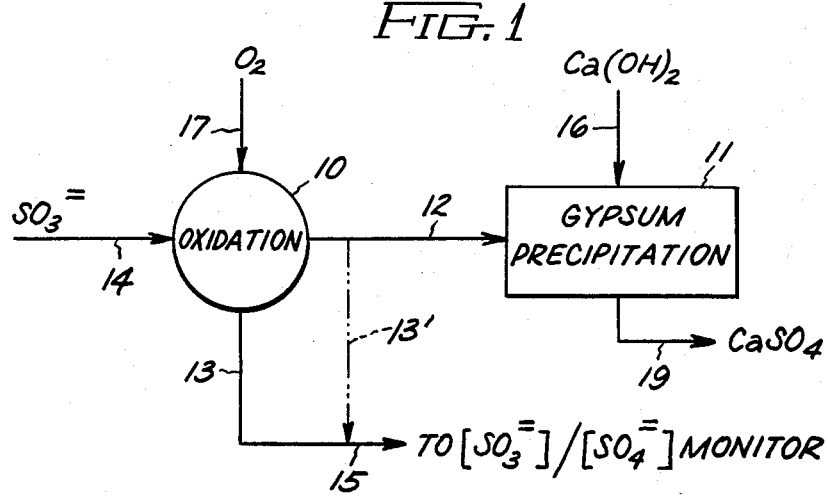
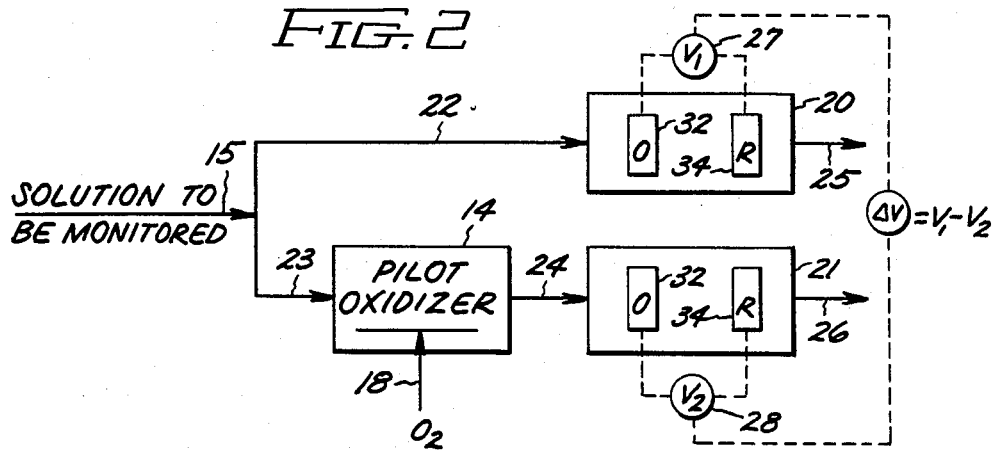
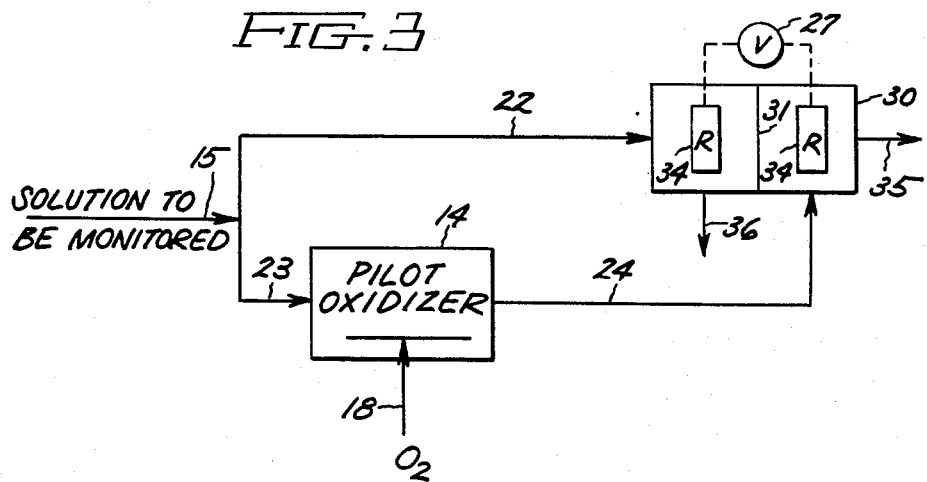

METHOD FOR CONTINUOUS MEASUREMENT OF THE SULFITE/SULFATE RATIO

BACKGROUND OF THE DISCLOSURE

This invention relates to a method for continuously measuring the sulfite to sulfate concentration ratio in a process solution. More particularly, the method involves determining the difference between oxidation potentials from a measurement of the potential difference between electrodes disposed in an absorbent and a reference solution. Even more particularly, the present invention is useful in monitoring and controlling the oxidation operation of the flue gas desulfurization processes.

In a wet flue gas desulfurization (WFGD) processes, $SO_2$ is absorbed and converted to a sulfite ion, which is further oxidized to a sulfate ion before being precipitated as $CaSO_4$. That is to say, in a wet FGD process, solutions containing sulfite ions are produced. These sulfite containing solutions are then oxidized so as to convert a major portion of the sulfite ions in the solution to the sulfate ion form. This sulfate form is then mixed with a slurry containing $Ca(OH)_2$, (that is, a lime slurry). This results in the formation of $CaSO_4$ which is formed as a crystal. This crystal precipitate is conventionally known as gypsum. It is disposed of or sold as construction material.

The oxidation of the sulfite containing solution to a sulfate solution is carried out by aerating the solution with an oxygen containing fluid, such as air. However, excessive aeration should be avoided because aeration consumes energy and excessive aeration destroys additives which may be present in the absorbent solution. The extent of this oxidation, particularly as measured by the ratio of the concentration of sulfite ions, $[SO_3^{--}]$, to the concentration of sulfate ions, $[SO_4^{--}]$, should be the one which gives the highest yield of gypsum but minimizes the energy consumption and organics destruction. These two concentrations are critical parameters which determine the performance and economics of the sulfite oxidation operation of the flue gas desulfurization process. Accordingly, it is seen that it is highly desirable to be able to determine the $[SO_3^{--}]/[SO_4^{--}]$ ratio so as to monitor and control this aspect of the desulfurization process.

For proper control of the oxidation process, it is desirable to be able to measure this ratio on a continuous, rather than a batch basis. Currently, this ratio can be determined by chemical titration of the solution or by analyzing each ion species with ion chromatography methods. However such methods are not continuous and require separate analysis of each sample which is taken. In addition, ion chromatography requires expensive equipment. Such methods are not conveniently applicable for on-line control of the flue gas desulfurization process. This gap in measurement and instrumentation technology has however, been filled by the present invention.

SUMMARY OF THE INVENTION

In accordance with a preferred embodiment of the present invention the process solution to be monitored is supplied to a vessel in which there is contained a redox electrode and a reference electrode so that the solution contacts each of these electrodes. The electrical potential difference between these electrodes is a measure of the sulfite to sulfate ratio and a simple galvanometer may be calibrated to indicate the ratio. In the preferred embodiment of the present invention this measurement is carried out continuously as the process solution for measurement is supplied to and simultaneously removed from the vessel. The aforedescribed method is particularly useful in those situations in which the effects of complete or nearly complete oxidation are known with respect to the sulfite to sulfate ratio. In cases in which this information is not known or readily available, a portion of the process solution to be monitored may be subjected to a thorough oxidation, after which the oxidized solution is supplied to a second similar vessel containing reference and redox electrodes, the potential difference between which provides a calibrating voltage signal. In this case, two potential differences are measured and the difference between these two differences provides the desired indicia for the sulfite to sulfate ratio. Alternatively, one may employ a single vessel partitioned by a porous barrier into first and second vessel portions each containing a reference electrode or each containing a redox electrode. One of the vessel portions is supplied with the solution to be monitored and the other portion is supplied with a thoroughly oxidized portion of the same solution. In this case, only the potential difference between the electrode in each vessel portion is measured to provide the desired indicia of the sulfite to sulfate ratio.

Accordingly, it is an object of the present invention to be able to monitor, on a continuous basis, the ratio of the concentration of sulfite ions to sulfate ions in a solution containing both ion species.

It is also an object of the present invention to be able to continuously monitor and improve the control of flue gas desulfurization processes.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a schematic diagram illustrating a sulfite oxidation portion of a wet flue gas desulfurization process;

FIG. 2 is a schematic diagram illustrating an embodiment of the present invention involving the measurement of two potential differences;

FIG. 3 is a schematic diagram illustrating another embodiment of the present invention employing a single vessel partitioned by a semi-permeable barrier into distinct portions;

DETAILED DESCRIPTION OF THE INVENTION

Figure 4:
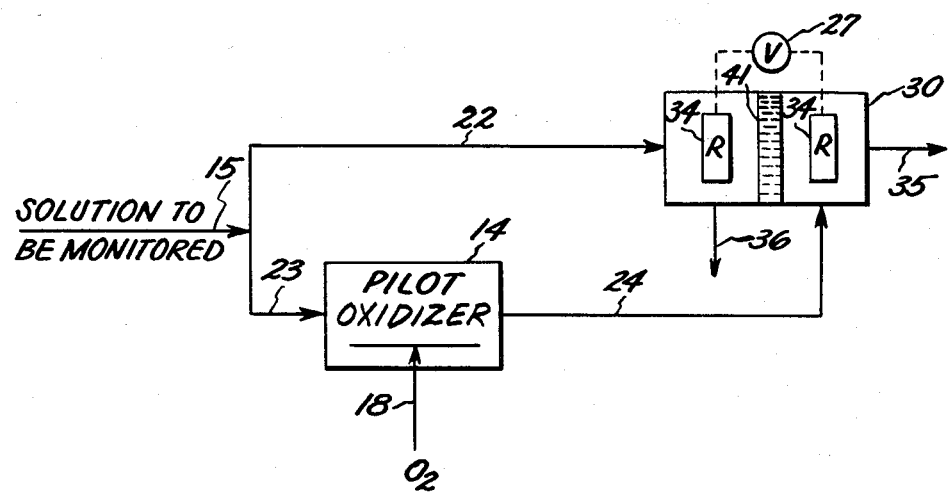
FIG. 4 is a schematic diagram illustrating an embodiment of the present invention similar to FIG. 3 except for the employment of a different form of semi-permeable barrier.

Before a detailed description of the continuous monitoring method of the present invention is described, it is useful to discuss the principles upon which the present invention operates. In particular, the electrochemical reaction for the oxidation of sulfite ions is described by the following equation:

$$SO_3^{--} + 2OH^- \rightarrow SO_4^{--} + H_2O + 2e^-$$

The oxidation potential for this reaction is given by the following equation:

$$V = E_o + \frac{RT}{zF} \ln \frac{[SO_3^{--}][OH^-]^2}{[SO_4^{--}]},$$

where, as above, the bracket symbols denote the concentration of the ion species shown within the brackets, and where R is the gas constant, T is the temperature in degrees Kelvin, z is the valence of the ion (in this case $z=2$) and where F is the Faraday constant. For simplicity, the fraction $(PT/zF)$ is defined herein to be the constant K which is measured in volts. In this way, a generated voltage provides a measure of the ratio $[SO_3^{--}]/[SO_4^{--}]$, the sulfite to sulfate ratio. If the natural logarithm in the above equation is written out so that the term containing the hydroxide ion concentration appears separately, it is seen that the oxidation potential V is equal to a first constant plus K times the logarithm of the desired ratio. The first constant is the sum $E_o + 2K \ln [OH^-]$. The value of $[OH^-]$ can be determined by the pH of solution. Accordingly, the voltage measurements can be made to provide the proper data for determining the sulfite to sulfate concentration ratio. Furthermore, it is convenient to have a base line of reference voltage using an oxidized solution of the same kind. In such an instance, the difference between two potentials is used to indicate the sulfite/sulfate ratio. This embodiment of applicant's invention is particularly useful in that the constants occurring in the above equations drop out as a result of the voltage subtraction or differencing operation. With respect to this aspect of the present invention, it should be noted herein that the continuous monitoring method in accordance with the present invention is carried out using only a small slip stream of the solution contained in the main apparatus. In short the present invention only requires relatively minor sample amounts drawn from the main process flow.

With these considerations in mind, a description of the present invention can now be more easily understood and appreciated. In particular, FIG. 1 illustrates, in a schematic fashion, an oxidation operation portion of the wet flue gas desulfurization process. In the portion shown, solution 14 containing sulfite ion species is introduced into oxidation apparatus 10 along with oxygen or oxygen containing fluid 17. It is the oxidation occurring in apparatus 10 which the present invention seeks to monitor. Following the oxidation treatment in apparatus 10 the treated solution 12 is supplied to gypsum precipitator 11. Oxidized solution 12 is therefore seen to contain a mixture of sulfite and sulfate ion species. While it is desirable to have as much of the sulfite ion species oxidized to the sulfate ion species as possible, it is not possible to determine the optimal quantities of oxygen containing fluid 17 to be supplied to oxidation apparatus 10, without determining the sulfite ion concentration found in solution 14. Furthermore, it is uneconomical to insure total oxidation in apparatus 10 simply by increasing the quantities of oxygen containing fluid 17 supplied thereto.

In addition to solution 12, precipitator 11 is supplied with slurry 16 of calcium hydroxide, $Ca(OH)_2$, resulting in the precipitation of gypsum or calcium sulfate $CaSO_4$ crystal which is removed from apparatus 11 as precipitate 19. While precipitate 19 is the principal product of the flue gas desulfurization process illustrated in FIG. 1, the solution that is most relevant to the present invention is a relatively small slip stream solution 15, which includes both sulfite and sulfate ion species. The solution to be monitored may be supplied directly from oxidation apparatus 10, as indicated by flow path 13 or may in fact be drawn from solution 12 prior to its delivery to precipitator 11 (as indicated by dotted flow path 13'). Nonetheless, in each case the solution to be monitored is provided to the various embodiments of the present invention illustrated in FIGS. 2-5 which are now more particularly discussed.

Figure 5:
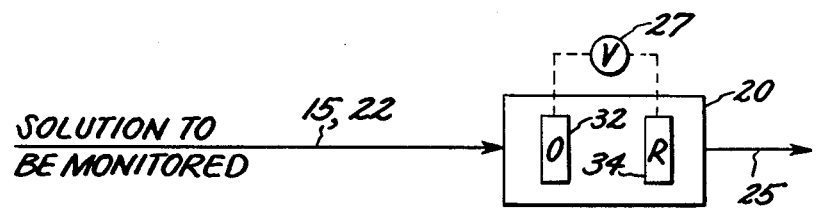
FIG. 5 is a schematic diagram of the process of the present invention which is particularly applicable in those situations in which information relating to the reference oxidation state of the sample solution is known.

FIG. 2 illustrates one embodiment of the present invention in which solution 15 to be monitored is divided into two distinct portions 22 and 23, which may be best characterized as "slip substreams". Solution 23 is supplied to pilot oxidizer 14 which is also provided with a supply of oxygen containing fluid 18 so as to produce oxidized reference solution 24. The oxidation process occurring in pilot oxidizer 24 is designed to convert the sulfite ion content in solution 23 into sulfate content at a desired level. In this way, solution 24 is made to operate as a reference solution. At the same time, solution 22 is supplied to vessel 20 which has disposed therein both redox electrode 32 and reference electrode 34. The description of these electrodes is given with more particularity below. Solution 22 is in contact with redox electrode 32 and reference electrode 34. Accordingly, voltmeter 27 indicates voltage $V_1$ which is employed to measure the oxidation potential between electrodes 32 and 34, as shown. Voltage $V_1$ is determined from the voltage equation above in which the sulfite to sulfate ion concentration ratio is dependent upon these respective concentrations in solution substream 22. However, voltage $V_1$ also includes constant terms dependent upon voltage $E_o$ and the pH of solution 22. If these values are known or can be reasonably estimated, the voltage $V_1$ may be employed directly as an indicia of the sulfite/sulfate concentration ratio. Such an embodiment is illustrated in FIG. 5. However, in the apparatus shown in FIG. 2, oxidized reference solution 24 is supplied to vessel 21, which also contains a redox electrode 32 and a reference electrode 34 in contact with solution 24 therein so that voltage $V_2$ may be measured across these electrodes by means of voltmeter 28. Voltage $V_2$ also contains constant terms determined by voltage $E_o$ and the pH of the solution. This fact means that the difference voltage, $V_1 - V_2$, defined to be $\Delta V$, is not dependent upon $E_o$ or the pH of the solution. Thus, $\Delta V$ provides a measure of the sulfite to sulfate concentration ratio in solutions 22 and 24. However, oxidation of solution 23 provides a solution in which the desired ratio exhibits an extremal value. Thus, voltage $\Delta V$ provides a measure of the degree of the oxidation of solution 22. Thus, means 29 for computing the difference between $V_1$ and $V_2$ provides an indicia, $\Delta V$, of the sulfite/sulfate ion concentration ratio. It is knowledge of this ratio that can be used to control the process occurring in oxidation apparatus 10. In particular, the value of $\Delta V$ may be used to control the rate of flow of oxygen containing fluid 17 into apparatus 10. It may also be used to control the residence time within apparatus 10 and the rate of supply of solution 14 to apparatus 10. Furthermore, control of the processes occurring in apparatus 10 may be controlled by varying power supplied to stirring or mixing means incorporated within apparatus 10. Lastly, since the preferable mode of operation of the present invention is continuous, vessels 20 and 21 are provided with outlets 25 and 26, respectively for the continuous removal of solutions 22 and 24 therefrom, respectively. Effluent solutions 25 and 26 may be discharged.

Additionally, the objects of the present invention may be carried out by means of an apparatus such as is shown in FIG. 3. FIG. 3 is similar to FIG. 2 in that solution 15 is divided into two portions, portion 22 and a second portion 23 which is oxidized in pilot oxidizer 14 to the sulfate species so as to produce slip substream solution 24. These two solutions are provided to vessel 30 which is divided into a first portion and a second portion by means of a semi-permeable barrier such as ion exchange membrane 31. Each of the vessel portions has disposed therein reference electrode 34 so that solutions 22 and 24 are in contact with the electrodes and with a semi-permeable barrier, which in the case of FIG. 3, comprises ion exchange membrane 31. Again, since the process for monitoring the desired ratio is preferably continuous, each vessel portion is provided with an outlet flow 35 and 36 respectively, to maintain the desired continuous, flow-through condition. As above, effluent solutions may be supplied to vessels 10 or 11. Also as above, voltmeter 27 measures oxidation potential between electrodes 34 in their respective vessel portions. The apparatus shown in FIG. 3 has the advantage that only a single voltmeter and vessel are required to provide a voltage signal V which provides the same information as the signal $\Delta V$ in the apparatus of FIG. 2.

The same objectives accomplished by the embodiment illustrated in FIG. 3 may also be carried out by the apparatus illustrated in FIG. 4 which shows substantially the same apparatus of FIG. 3, except that ion exchange membrane 31 is replaced with a different semi-permeable barrier such as liquid junction 41. However, the operation of the resulting apparatus is essentially identical.

As pointed out above, it is also possible to employ an apparatus such as that shown in FIG. 5 to provide the desired indicial voltage V from voltmeter 27, particularly if the voltage $V_2$ from FIG. 2 is known or can be calculated beforehand. If so, proper calibration of voltmeter 27 provides the desired indicia. Furthermore, the apparatus of FIG. 5 is also particularly useful if, in controlling the process occurring in apparatus 10, the primary concern is with the change or rate of change in the sulfite/sulfate concentration ratio.

In the processes and devices shown in FIGS. 2-5, the redox electrode typically comprises a material such as gold or platinum. However, other noble metal materials may also be employed. The reference electrode typically comprises a combination of mercury and mercury sulfate. However, other employable reference electrode materials include mercury, mercury chloride and potassium chloride.

In the situation in which an aerated solution is made to contact a platinum redox electrode, there exists the possiblity of error or instability in electrode potential because of adsorption of gases at the platinum electrodes. The adsorbed gas may introduce a chemical potential which affects the measurement of the solution potential. In order to solve this problem, a known amount of standard redox additive such as potassium ferricyanide $K_3Fe(CN)_6$ and potassium ferric EDTA(ethylene diamine tetracetic acid) is continuously added to the solution to be measured. The potassium ferricyanide is converted to potassium ferrocyanide $K_4Fe(CN)_6$ by reaction with sulfite ion present in the solution. The potassium ferricyanide/ferrocyanide redox pair produces a stable and accurate potential signal at the electrode because the electrode reaction depends on electron transfer and not chemical reaction. The additive may be introduced into the vessel or vessels directly or added to the slip stream of the process solution.

In the embodiments of the present invention shown in FIGS. 3 and 4, it is possible to employ redox electrodes 32 in place of reference electrodes 34 which are illustrated. If this is done though, then it is necessary to replace the electrode in each vessel portion so that the electrode type in each vessel matches. Moreover, it is in fact preferable to employ redox electrodes 32 in the embodiments shown in FIGS. 3 and 4.

By way of example and not limitation, experiments have been performed indicating the effectiveness of the disclosed process and apparatus for carrying out the purposes of the present invention. In particular, a 0.1 M sodium sulfite, $Na_2SO_3$, solution buffered at pH 8 was oxidized by aeration and the change of redox potential was measured using a platinum wire redox electrode with a reference electrode comprising mercury and mercury sulfate ($Hg_2SO_4$). The redox potential changed from $-310$ mV to $-261$ mV after aeration for 104 minutes. The redox potential of 0.1 M sodium sulfate, $Na_2SO_4$ with the same composition of buffering agents was $-257$ mV. This result indicates that the redox potential is related to conversion of sulfite to sulfate or more particularly to the sulfite to sulfate concentration ratio.

Another experiment involved direct measurement of the potential difference between aerated and non-aerated sodium sulfite solutions separated by an anion exchange membrane. Reference electrodes as described above were employed. The potential difference measured was initially 0.86 mV and increased to 10.80 mV after aeration for 51 minutes. The result of this experiment demonstrated that the sulfite to sulfate concentration ratio or the oxidation state, can be determined by direct measurement of potential difference between the adsorbent and reference solutions with the method schematically shown in FIG. 3.

From the above, it may be appreciated that the method and apparatus of the present invention provide a facile means for performing the continuous monitoring of the sulfite to sulfate concentration ratio in flue gas desulfurization processes. It can be further seen that the present invention requires only a small slip stream solution from an oxidation reactor in the desulfurization process. The present invention also provides a means for controlling a number of key parameters in the desulfurization process so as to make it possible to optimize the efficiency and economy of the process by varying key variables such as flow rates and residence times. It is also seen that the present invention provides for "on-line" monitoring and avoids the previously employed batch type monitoring which was performed. Lastly, it is seen that the present invention may be easily and inexpensively implemented.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method to monitor the ratio of sulfite ion species concentration to sulfate ion species concentration and the rate of change thereof in a solution containing said species, said method comprising the steps of:

supplying at least a portion of said solution containing said sulfite and said sulfate ion species to a vessel in which there is disposed a redox electrode and a reference electrode so that both said electrodes are in contact with said solution;

determining the electrical potential difference, $V_1$, between said electrodes;

simultaneously with said supplying step, oxidizing a portion of said supply solution and supplying said oxidized solution to a second vessel in which there is disposed a second redox electrode and a second reference electrode so that both of said second electrodes are in contact with said oxidized solution;

determining the electrical potential difference, $V_2$, between said second electrodes; and determining the difference between $V_1$ and $V_2$.

2. The method of claim 1 in which said supplying step is performed continuously along with continuous removal of said solution from said vessel.

3. The method of claim 1 in which said redox electrode comprises platinum.

4. The method of claim 1 in which said redox electrode comprises gold.

5. The method of claim 1 in which said reference electrode comprises mercury and mercury sulphate.

6. The method of claim 1 in which an additive is provided in at least one of said vessels to provide a stable potential difference, said additive comprising material selected from the group consisting of potassium ferricyanide and potassium iron EDTA.

7. A method to monitor the ratio of sulphite ion species to sulphate ion species in a solution containing said species, said method comprising the steps of:

supplying a solution containing said sulphite and said sulphate ion species to a first portion of a vessel internally divided by a semi-permeable barrier into first and second vessel portions, said first vessel portion having disposed therein a first reference or redox electrode in contact with said solution in said first vessel portion, said second vessel portion having disposed therein a second reference or redox electrode, each of said vessel portions having contained therein the same kind of electrode;

oxidizing a portion of said solution prior to supplying said solution to said second vessel portion;

simultaneously with said previous supply step, supplying to said second vessel portion a quantity of said oxidized solution, said oxidized solution being in contact with said second reference electrode in said second vessel portion; and determining the electrical potential difference, V, between said first and second electrodes.

8. The method of claim 7 in which said supplying step is performed continuously along with continuous removal of solution from the first and second portions of said vessel.

9. The method of claim 7 in which said barrier comprises an ion exhange membrane.

10. The method of claim 7 in which said barrier comprises a liquid junction.

11. The method of claim 7 in which an additive is provided in at least one of said vessel portions to provide a stable potential difference, said additive comprising material selected from the group consisting of potassium ferricyanide and potassium iron EDTA.

* * * * *